United States Patent Office.

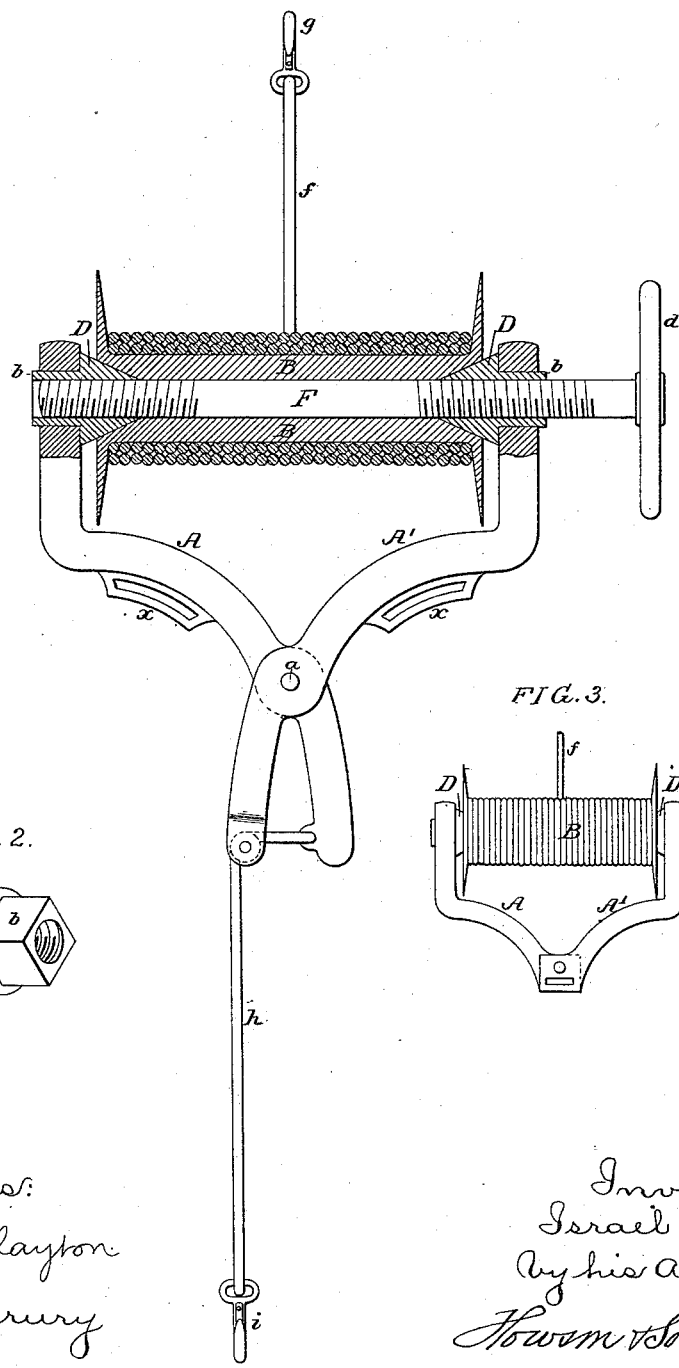

ISRAEL F. GOOD, OF NEW VILLAGE, NEW JERSEY, ASSIGNOR OF ONE-HALF TO CHARLES M. PETERS, OF ALLENTOWN, PENNSYLVANIA.

FIRE-ESCAPE.

SPECIFICATION forming part of Letters Patent No. 309,141, dated December 9, 1884.

Application filed October 6, 1884. (No model.)

*To all whom it may concern:*

Be it known that I, ISRAEL F. GOOD, a citizen of the United States, and a resident of New Village, Warren county, New Jersey, have invented certain Improvements in Fire-Escapes, of which the following is a specification.

The object of my invention is to so construct a fire-escape that the speed of the descent will be uniform, whatever the weight of the person using the escape, and can be readily regulated as desired.

In the accompanying drawings, Figure 1 is a view, partly in section and partly in elevation, of my improved fire-escape; Fig. 2, a detached view of part of the same; and Fig. 3, a side view on a small scale, showing a modified form of the device.

In Fig. 1, A A' represent two levers, pivoted together by a pin, $a$, the long arms of these levers being bent outward for the reception of a reel or drum, B, and the upper portion of each lever having formed therein an opening, of square or other polygonal form, for the reception of the stem $b$ of a nut, D, these nuts being adapted to the threaded portions of a rod, F, which passes through the reel B, and has at one end a hand-wheel, $d$, or other equivalent means, by which it may be readily turned in either direction. The reel B can turn on the rod F, and at each end of the reel is a tapering opening, that at one end receiving the nut D, carried by one lever, and the nut of the other lever being adapted to the opening at the opposite end of the reel. Upon the reel is wound a rope, cord, or chain, $f$, having at the upper end a snap-hook, $g$, or other suitable means of securing this end of the rope to any fixed object at the point from which the descent is to be made.

To the short arm of the lever A is connected one end of the rope, cord, or chain $h$, which passes around a roller carried by the short arm of the lever A', and is provided with a snap-hook, $i$, or other means of attaching it to the person making the descent. The weight of the person is thus exerted to draw the short arms of the levers together, and thereby effect the thrusting of the nuts D into the ends of the reel B, so that said nuts will act as brakes to retard the unwinding of the rope, cord, or chain from said reel, and thus check the speed of the descent. One of the threads on the rod F is right-handed and the other left-handed, so that by turning said rod in one direction the nuts D are caused to move toward each other, and by turning the rod in the opposite direction said nuts will be caused to move away from each other. By this means the nuts may be so adjusted that their braking action upon the wheel will be most effective. Each of the levers A A' has a loop, $x$, for the reception of an additional supporting-strap; and, if desired, the short arms of the levers may have a slot, as shown in Fig. 3, the supporting-strap being adapted to these slots, and tending to prevent any outward movement of the long arms of the levers. The construction shown in Fig. 1, however, is preferred.

I claim as my invention—

1. The combination of a suspending-rope, $f$, a reel or drum, B, upon which said rope is wound, a pair of levers, A A', and a pair of nuts, D D, carried by said levers and adapted to openings in the ends of the drum, as set forth.

2. The combination of the suspending-rope $f$, drum B, levers A A', the nuts D D, carried by said levers and adapted to openings in the ends of the drum, and the rod F, having right and left hand threads adapted to the nuts, as set forth.

In testimony whereof I have signed my name to this specification in the presence of two subscribing witnesses.

ISRAEL F. GOOD.

Witnesses:
 CARL KEYES,
 A. K. WITTMAN.